US010528305B2

United States Patent
Yasui

(10) Patent No.: US 10,528,305 B2
(45) Date of Patent: Jan. 7, 2020

(54) SETTING MANAGEMENT SYSTEM WITH MULTIPLE IMAGE FORMING APPARATUSES AND MANAGEMENT SERVER

(71) Applicant: KYOCERA Document Solutions Inc., Osaka (JP)

(72) Inventor: Toru Yasui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/942,358

(22) Filed: Mar. 30, 2018

(65) Prior Publication Data

US 2018/0285041 A1 Oct. 4, 2018

(30) Foreign Application Priority Data

Mar. 31, 2017 (JP) .................................. 2017-070034

(51) Int. Cl.
G06F 3/12 (2006.01)
H04N 1/00 (2006.01)
H04L 12/24 (2006.01)

(52) U.S. Cl.
CPC ............ G06F 3/1231 (2013.01); G06F 3/123 (2013.01); G06F 3/1204 (2013.01);
(Continued)

(58) Field of Classification Search
CPC . G06F 3/1231; G06F 3/1273; H04N 1/00037; H04N 1/00042; H04N 1/00058; H04N 1/00079; H04N 1/00344
See application file for complete search history.

(56) References Cited

U.S. PATENT DOCUMENTS 7,002,972 B1 2/2006 Endo
2004/0260803 A1* 12/2004 Nakamura ............. G06K 15/00
709/224

(Continued)

FOREIGN PATENT DOCUMENTS

JP 2006-099300 A 4/2006
JP 2007-130838 A 5/2007

OTHER PUBLICATIONS

Extended European Search Report dated Aug. 6, 2018.

*Primary Examiner* — Benjamin O Dulaney
(74) *Attorney, Agent, or Firm* — Hawaii Patent Services; Nathaniel K. Fedde; Kenton N. Fedde

(57) ABSTRACT

Provided is a setting management system for managing the change status of setting information in an image forming apparatus during operation. Multiple image forming apparatuses start operating based on the same setting information in which operation setting values transmitted from a management server are reflected. Each of the image forming apparatuses receives changes in the setting information by multiple setting-receiving units during operation. In each of the setting-receiving units, a change-detecting unit detects that the setting information is changed. The setting-change status of setting information is correlated with the setting-receiving unit and transmitted by a change-status-transmitting unit. The management server receives the setting-change status from an image forming apparatus by a server-communication unit. As a result, a setting-management unit collectively manages histories of the setting changes of multiple image forming apparatuses based on the received setting-change status and the operation setting values.

7 Claims, 7 Drawing Sheets

(52) U.S. Cl.
CPC .......... *G06F 3/1205* (2013.01); *G06F 3/1255* (2013.01); *G06F 3/1258* (2013.01); *G06F 3/1273* (2013.01); *G06F 3/1281* (2013.01); *G06F 3/1285* (2013.01); *H04N 1/00037* (2013.01); *H04N 1/00058* (2013.01); *H04N 1/00079* (2013.01); *H04N 1/00344* (2013.01); *H04L 41/0806* (2013.01); *H04L 41/0816* (2013.01); *H04L 41/0846* (2013.01); *H04N 1/00127* (2013.01)

(56) References Cited

U.S. PATENT DOCUMENTS

| | | | |
|---|---|---|---|
| 2005/0027486 A1* | 2/2005 | Kitada | G06F 3/1207 702/185 |
| 2010/0088609 A1 | 4/2010 | Kawana | |
| 2012/0069392 A1* | 3/2012 | Kawana | H04N 1/00344 358/1.15 |
| 2012/0268782 A1 | 10/2012 | Hamaguchi | |
| 2014/0355051 A1* | 12/2014 | Nakajima | H04N 1/00344 358/1.15 |
| 2015/0098105 A1* | 4/2015 | Yamaki | H04N 1/00344 358/1.14 |
| 2016/0065766 A1 | 3/2016 | Miyamoto | |
| 2016/0219102 A1* | 7/2016 | Nakajima | H04L 41/28 |
| 2016/0358047 A1* | 12/2016 | Asahara | H04N 1/00344 |
| 2017/0201635 A1* | 7/2017 | Takamoto | H04L 43/0876 |

\* cited by examiner

SETTING MANAGEMENT SYSTEM WITH MULTIPLE IMAGE FORMING APPARATUSES AND MANAGEMENT SERVER

INCORPORATION BY REFERENCE

This application is based on and claims the benefit of priority from Japanese Patent Application No. 2017-070034 filed on Mar. 31, 2017, the contents of which are hereby incorporated by reference.

BACKGROUND

The present disclosure relates to a setting management system with multiple image forming apparatuses and a management server.

Conventionally, image forming apparatuses such as copiers, MFPs and the like that are installed in a company or the like are managed by the management department. When a problem occurs in an image forming apparatus such as a copier, MFP or the like, a person in charge from the management department checks the setting values and the like of the image forming apparatus, and analyzes the cause of the problem and solves the problem. Therefore, when multiple image forming apparatuses are installed together in an organization, operation is started in a state in which the same setting information is reflected in each of the image forming apparatuses, making it easier to manage the setting values.

SUMMARY

The setting management system according to the present disclosure is a setting management system that includes a management server that transmits operation setting values, and multiple image forming apparatuses that start operation based on the same setting information in which the operation setting values are reflected. Each of the image forming apparatuses includes multiple setting-receiving units, a change-detecting unit, and a change-status-transmitting unit. The multiple setting-receiving units receive changes in the setting information during operation. The change-detecting unit detects each of the changes in the setting information by the respective setting-receiving units. The change-status-transmitting unit, every time a change in the setting information is detected by the change-detecting unit, correlates the change in the setting information with the setting-receiving unit that receives the change, and transmits setting-change status of the setting information. The management server includes a server-communication unit and a setting-management unit. The server-communication unit receives the setting-change status from the image forming apparatus. The setting-management unit collectively manages the histories of the setting changes of the multiple image forming apparatuses based on the setting-change status that is received by the server-communication unit and the operation setting values.

DETAILED DESCRIPTION

In the following, embodiments according to the present disclosure will be explained in detail with reference to the drawings. Incidentally, in the following embodiments, the same reference numbers will be given to configuration having the same function.

Figure 1:
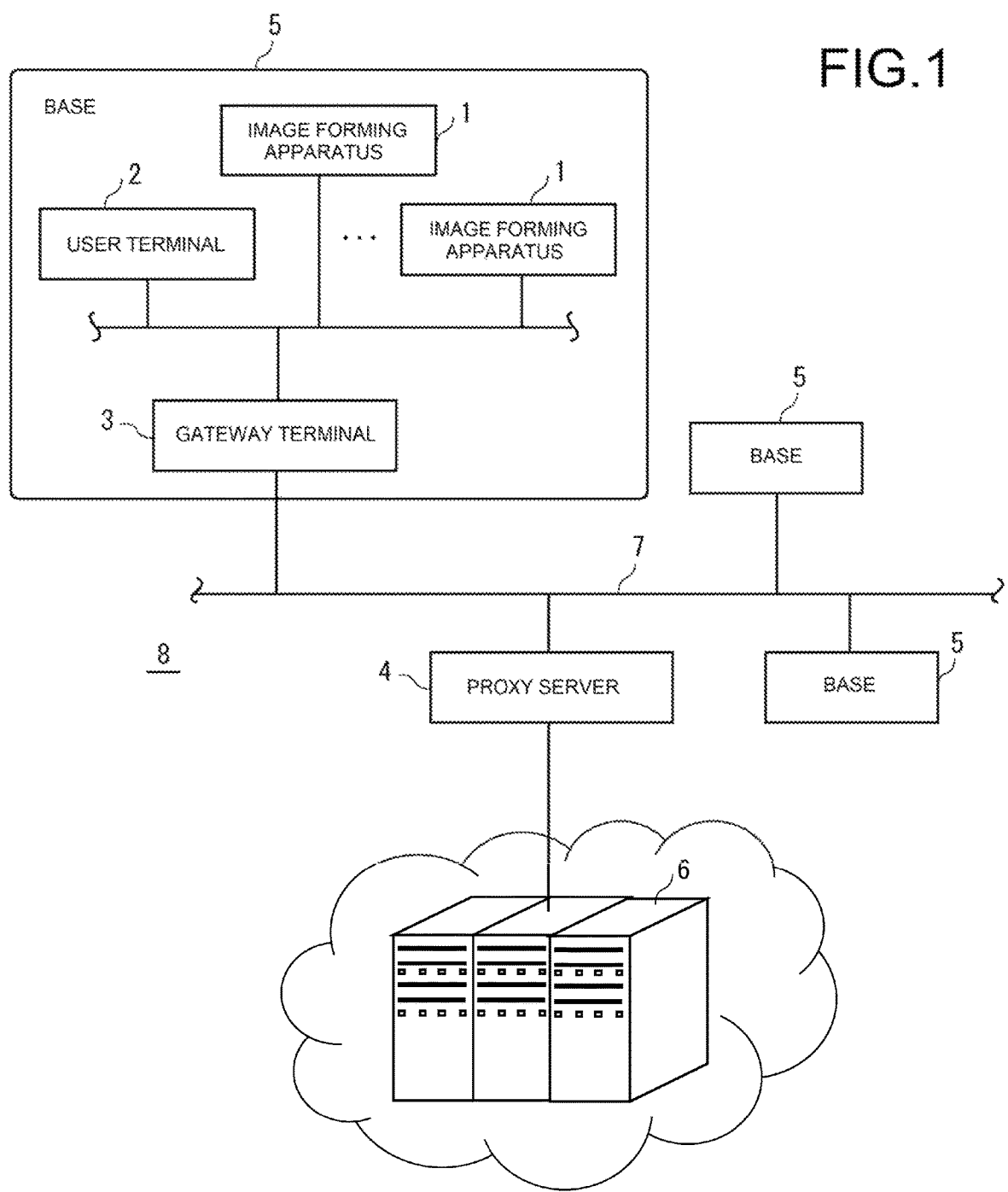
FIG. 1 is a system configuration diagram of an embodiment of a setting management system according to the present disclosure.

As illustrated in FIG. 1, in the setting management system 8 of this embodiment, multiple bases 5 that are connected by an in-house network system 7 such as a LAN (Local Area Network), WAN (Wide Area Network) and the like are connected to a management server 6 on a the cloud via a proxy server 4 that functions as a firewall.

Each of the bases 5 exists in various places such as France, Spain, Germany and the like, and includes multiple devices such as user terminals 2, image forming apparatuses 1, and the like, and a gateway terminal 3 that connects each of the devices to the in-house network 7. The image forming apparatuses 1 in a base 5 are configured so as to be able to communicate with the management server 6 via the gateway terminal 3 and proxy server 4. In addition, security can be further increased by providing a router or server that performs communication with the management server 6 via a VPN (Virtual Private Network), or by providing a DMZ (DeMilitarized Zone).

Figure 2:
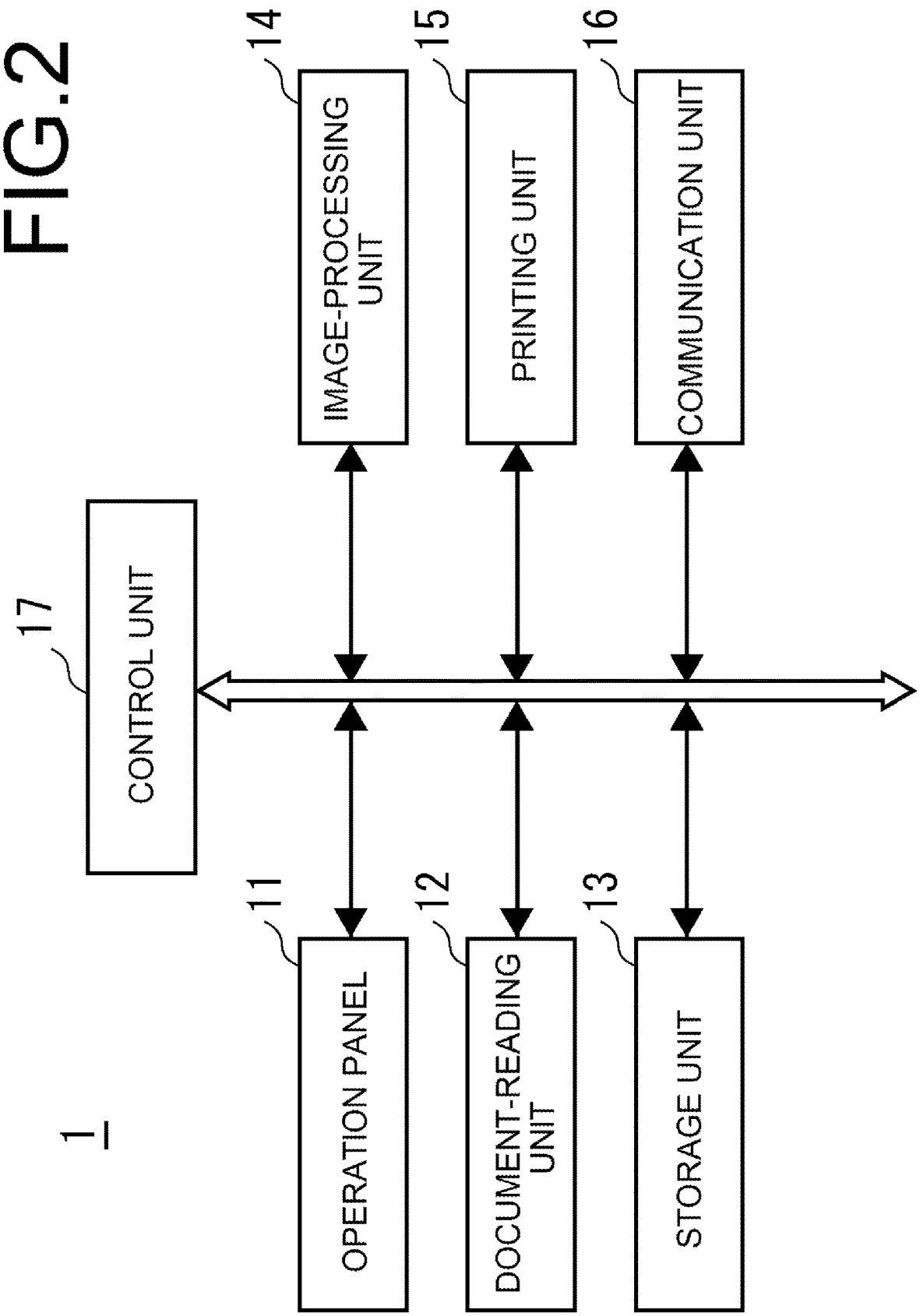
FIG. 2 is a schematic diagram illustrating the overall configuration of an embodiment of an image forming apparatus according to the present disclosure.

FIG. 2 is a schematic configuration diagram illustrating the overall configuration of an image forming apparatus 1 that is arranged at each of the bases 5. The image forming apparatus 1 is a printer, a copier, an MFP or the like, and includes an operation panel 11, a document-reading unit 12, and image-processing unit 14, a storage unit 13, a printing unit 15, a communication unit 16 and a control unit 17.

The operation panel 11 includes a touch panel and operation buttons. The touch panel is provided with transparent pressure sensitive sensors on the surface of a display unit that displays various operation keys and the image forming status, and functions as a display unit and input unit.

The document-reading unit 12 is a scanner that reads a document image by irradiating light onto a document that is supplied by a document feeding apparatus or a document that a user places on the platen glass, and receiving the reflected light or the like.

The storage unit 13 is a storage unit such as a semiconductor memory, HDD (Hard Disk Drive) or the like, and is a storage unit that stores image data and the like that is read by the document-reading unit 12. The storage unit 13 may also be provided with areas for each document box that can be specified as a storage destination for document data. Moreover, the storage unit 13 stores setting information 131 in which setting values of each of the setting items are set. The setting information 131 includes settings related to various operation control of the image forming apparatus 1. For example, the setting information 131 includes user information such as an address book and the like, maintenance setting values that can be set by a maintenance manager, setting values and the like of various functions such as copying, scanning, and the like. The setting information 131 may also be distributed and stored in the RAM, ROM or the like included in the image forming apparatus 1.

The image-processing unit 14 is a processing unit that performs specified image processing on image data. In the image-processing unit 14, for example, image processing such as enlargement/reduction processing, density adjustment, gradation adjustment and the like is performed.

The printing unit 15 is a printing unit that prints image data that is stored in the storage unit 13. The printing unit 15, for examples, forms a latent image on the surface of a photosensitive drum based on image data that is read from the storage unit 13, performs image formation in which toner is used to form that latent image into a toner image, transfers the toner image from the photosensitive drum to printing paper, fixes the toner image to the printing paper, and discharges the printing paper.

The communication unit 16 has a function of transmitting and receiving various data to and from each of the devices in the in-house network 7 via the gateway terminal 3 by wired or wireless communication. Moreover, the communication unit 16 has a function of transmitting and receiving various data to and from the management server 6 via the gateway terminal 3 and proxy server 4.

The control unit 17 connects to each of the operation panel 11, the document-reading unit 12, the storage unit 13, the image-processing unit 14, the printing unit 15 and the communication unit 16 via a bus. The control unit 17 is an information-processing unit such as a microcomputer and the like that includes a CPU, ROM, RAM and the like. The ROM stores a control program for performing operation control of the image forming apparatus 1. The control program may be recorded on a computer-readable recording medium and provided to the control unit 17. The CPU of the control unit 17 performs overall control of the apparatus by reading the control program that is stored in the ROM, expanding the control program in the RAM, and executing the control program.

Figure 3:
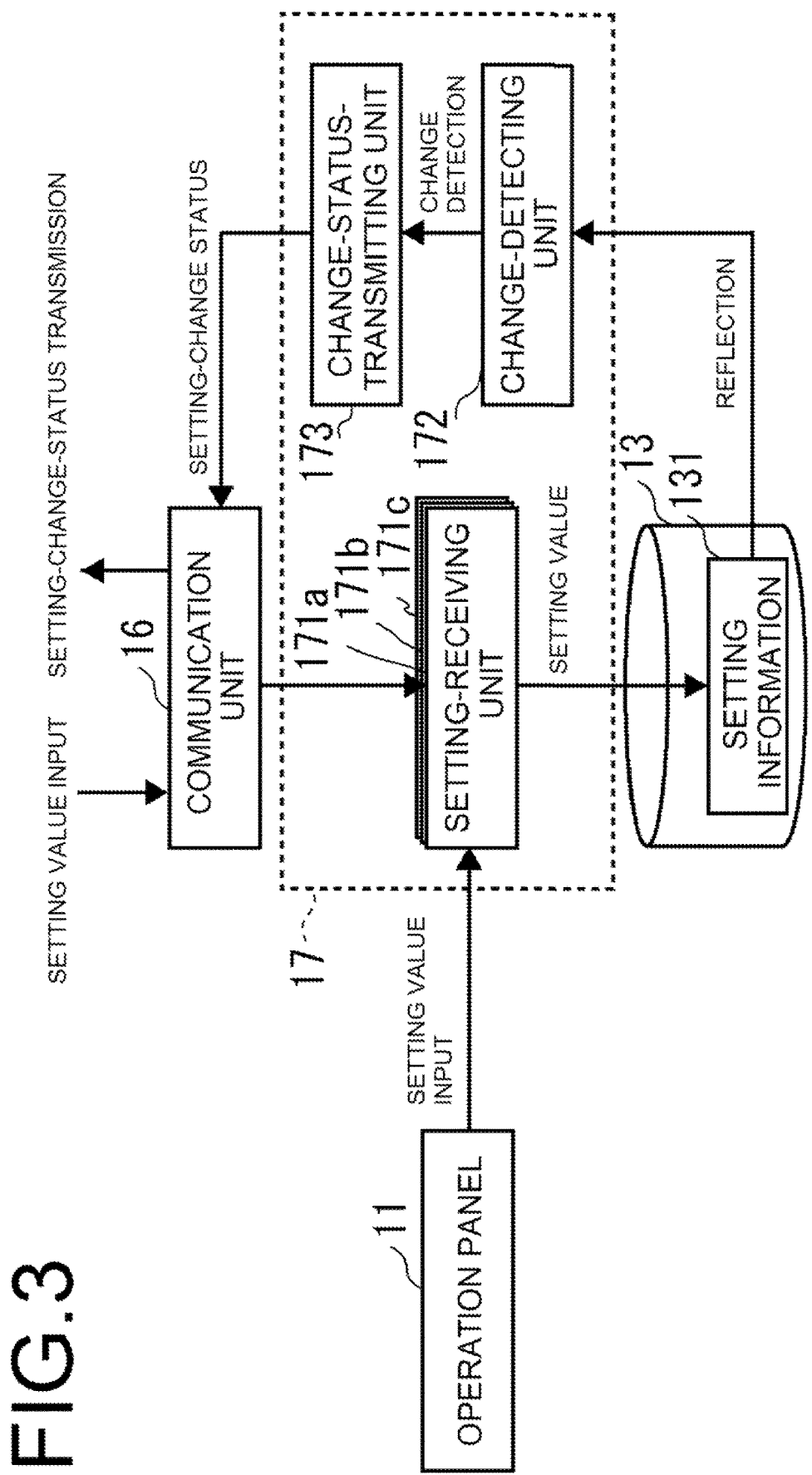
FIG. 3 is a block diagram illustrating the control configuration of the control unit illustrated in FIG. 2.

Next, the control configuration of the control unit 17 will be explained with reference to FIG. 3. The control unit 17 functions as setting-receiving units 171a, 171b, 171c, a change-detecting unit 172, and a change-status-transmitting unit 173.

The setting-receiving units 171a, 171b, 171c have the function of receiving input of setting values, and reflecting the inputted setting values in the setting information 131. The setting-receiving unit 171a has a function for displaying a setting screen on the operation panel 11 for receiving setting value input, and reflecting the setting values that are inputted via the setting screen in the setting information 131. The setting-receiving unit 171b has a Web server function, and has a function for providing a Web screen for receiving input of setting values for the user terminal 2 or management server 6 via the communication unit 16, and reflecting the setting values that are inputted via the Web screen in the setting information 131. The setting-receiving unit 171c has a function for receiving input of setting values via an application such as a printer driver and the like that is installed beforehand in the user terminal 2 or management server 6, and reflecting the setting values that are inputted via the application in the setting information 131.

The change-detecting unit 172 has a function for detecting that the setting values of the setting information 131 have been changed by the setting-receiving units 171a, 171b, 171c. For example, the change-detecting unit 172 may monitor the setting information 131, and determine whether or not the setting values of the setting information 131 change before and after the setting values are reflected by the setting-receiving units 171a, 171b, 171c.

The change-status-transmitting unit 173 has a function of acquiring the setting-change status 332 (refer to FIG. 5) when the change-detecting unit 172 detects a change in the setting values, and transmitting the acquired setting-change status 332 to the management server 6 by the communication unit 16.

The setting-change status 332 includes the date and time when a setting value is changed, user information of the user that changed the setting value (information of the person who made the change), device information, interface information that indicates the setting-receiving unit 171a, 171b, 171c that receives the setting change, the changed setting item, the setting value after the change, and the like. The device information includes the model name (machine type) and serial number of the image forming apparatus 1, location information that indicates the installation location, and the like. The interface information is one of the operation panel 11 that indicates the setting-receiving unit 171a, the Web that indicates the setting-receiving unit 171b, or an API (Application Programming Interface) that indicates the setting-receiving unit 171c. In other words, the interface information indicates whether a setting value is changed by the setting-receiving unit 171a via the operation panel 11, or changed by the setting-receiving unit 171b via the Web screen, or changed by the setting-receiving unit 171c via an application such as a printer driver or the like. In this way, specification changes or restrictions of an interface by which a user performs a change can be verified by transmitting the setting-change status 332 that is associated with the setting-receiving unit 171a, 171b, 171c that received the change in setting information 131. The setting-change status 332 is transmitted as a text file 331 (refer to FIG. 5) in a format such as XML format, CSV format or the like.

Moreover, the image forming apparatus 1 has as transmission mode for transmitting the setting-change status 332, a data-consolidating mode that consolidates and transmits the setting-change status 332, and a real time mode that transmits the setting-change status 332 in real time. The change-status transmitting unit 173 includes a transmission-mode flag in the setting-change status 332 for indicating whether the transmission mode for transmission is the data-consolidating mode or the real time mode, and transmits the setting-change status 332.

Figure 4:
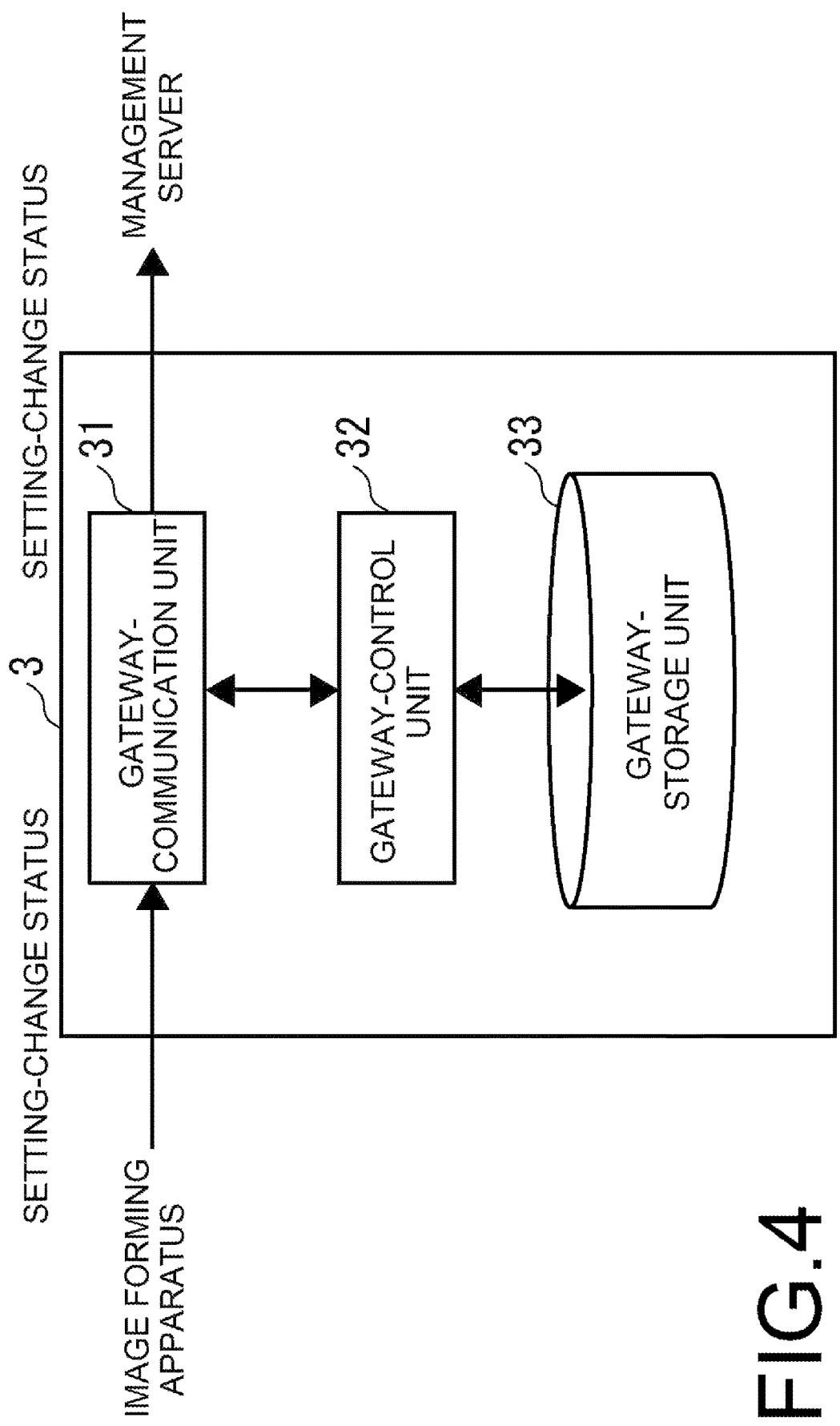
FIG. 4 is a schematic diagram illustrating the overall configuration of the gateway terminal illustrated in FIG. 1.

Next, the schematic configuration of the gateway terminal 3 will be explained with reference to FIG. 4. The gateway terminal 3 is a server, a set-top box or the like, and includes a gateway-communication unit 31, a gateway-storage unit 33 and a gateway-control unit 32.

The gateway-communication unit 31 has a function of relaying various data that is transmitted and received between each of the devices in the base 5. Moreover, the gateway-communication unit 31 has a function of relaying various data that is transmitted and received between each of the devices in the base 5 and each of the devices of other bases 5. Furthermore, the gateway-communication unit 31 has a function of relaying various data that is transmitted and received between image forming apparatuses 1 in the base 5 and the management server 6.

The gateway-storage unit 33 is a storage unit such as a semiconductor memory, HDD or the like. The gateway-storage unit 33 may also be an external storage apparatus such as an SD card, USB memory, external HDD or the like.

The gateway-control unit 32 is connected to the gateway-communication unit 31 and the gateway-storage unit 33, respectively. The gateway-control unit 32 is an information-processing unit such as a microcomputer and the like that includes a CPU, ROM, RAM and the like. The ROM stores a control program for performing operation control of the gateway terminal 3. The control program may be recorded on a computer-readable recording medium and provided to the gateway-control unit 32. The CPU of the gateway-control unit 32 performs overall control of the terminal by reading the control program that is stored in the ROM, expanding the control program in the RAM and executing that control program.

Moreover, the gateway-control unit 32 controls transmission of the setting-change status 332 of the image forming apparatus 1 that is received by the gateway-communication unit 31 based on the transmission-mode flag that is included in the setting-change status 332. More specifically, when the transmission-mode flag is the data-consolidating mode, the gateway-control unit 32, after the setting-change status 332 is received by the gateway-communication unit 31, temporarily stores the setting-change status 332 in the gateway-storage unit 33, and transmits the consolidated setting-change status 332 all together to the management server 6 at specified timing such as once every hour, once every day or the like. When the transmission-mode flag is the real time mode, the gateway-control unit 32, after the gateway-communication unit 31 receives the setting-change status 332, immediately transmits the setting-change status 332 to the management server 6.

Figure 5:
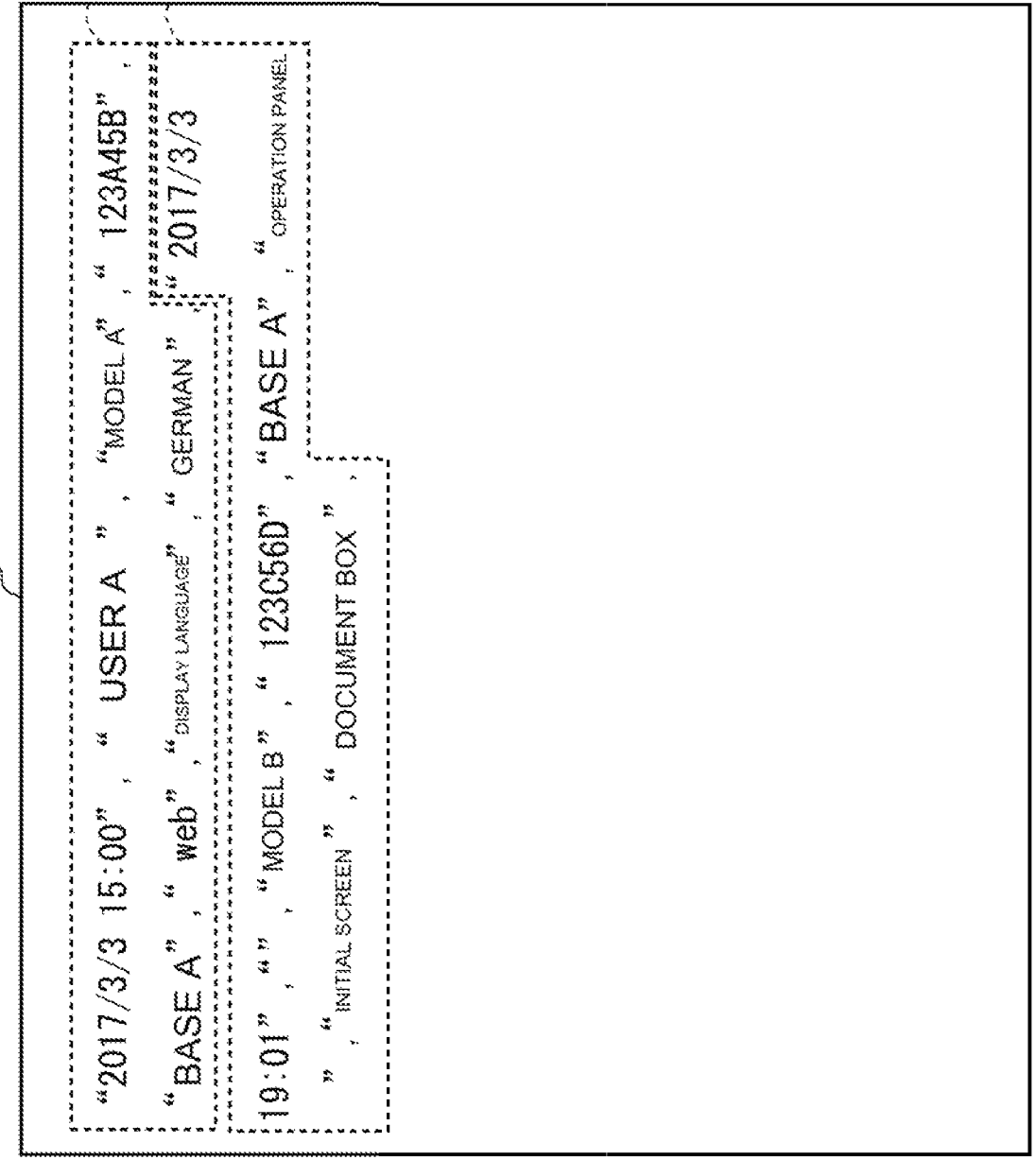
FIG. 5 is an accumulated example of setting-change status of the gateway storage unit illustrated in FIG. 4.

FIG. 5 is an example of accumulated setting-change status 332 of the gateway-storage unit 33. In the data-consolidating mode, the gateway-control unit 32, by cutting and pasting or the like for example, stores each received setting-change status 332 in the gateway-storage unit 33 as a text file 331. In FIG. 5, an example is illustrated in which the setting-change status 332 is grouped all together in a CSV file, with each data being separated by commas, however, the format may also be XML format. Moreover, in the setting-change status 332, each data may be arranged in a predetermined order so that the management server 6 can easily input the data to a database or the like. In FIG. 5 the order is "date and time of the change of the setting value", "user information of the user that changed the setting value", "model name (machine type)", "serial number", "location information", "interface information of the interface that received the change of the setting value", "changed setting item", and "setting value after the change". Information that cannot be identified is indicated as an empty (" "). In addition, the gateway-control unit 32 may also create a text file 331 for each image forming apparatus 1, and accumulate the respective setting-change status 332.

When a specified timing is reached, the gateway-control unit 32 reads the setting-change status 332 that is stored in the gateway-storage unit 33, and transmits the setting-change status 332 to the management server 6 by the gateway-communication unit 31. By accumulating and transmitting setting-change status 332 that is individually received from the image forming apparatus 1 at specified timing in this way, the frequency of communication by the gateway terminal 3 can be suppressed. Furthermore, the gateway-control unit 32 may transmit setting-change status 332 of a transmission target in a compressed state such as in ZIP format or the like. The text file 331 has a high compression effect, so the amount of communication data can be reduced. Accordingly, the cost of communication in the case of a contract in which the connection billing is on a usage basis can be reduced.

Figure 6:
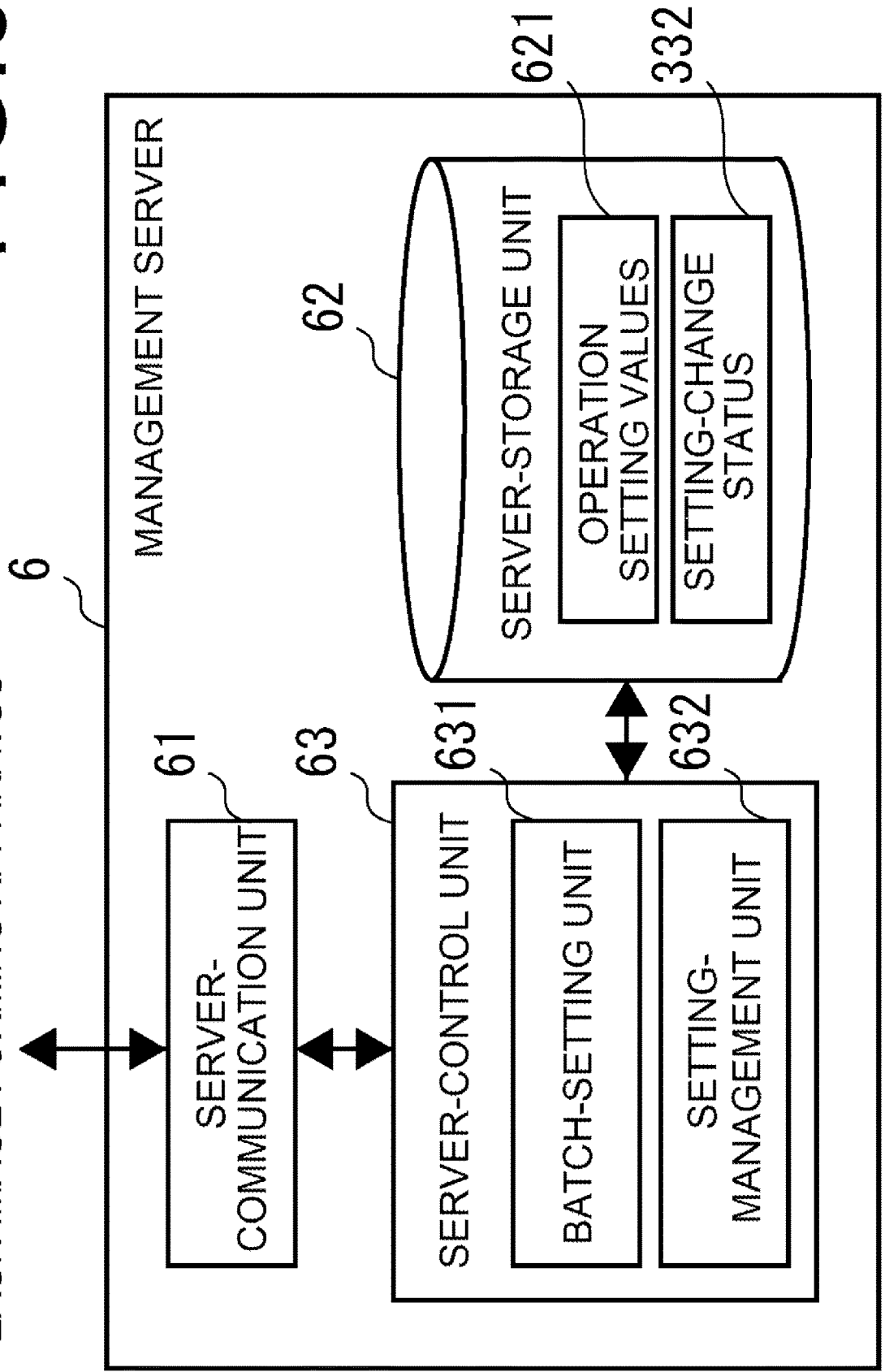
FIG. 6 is a schematic diagram illustrating the overall configuration of the management server illustrated in FIG. 1.

FIG. 6 is a schematic diagram illustrating the overall configuration of the management server 6. The management server 6 is provided on the cloud. The management server 6 may be a cloud system that includes a server group such as a main server, an XMPP (Extensible Messaging and Presence Protocol) server, a database server and the like. The management server 6 includes a server-communication unit 61, a server-storage unit 62 and a server-control unit 63.

The server-communication unit 61 has a function of transmitting and receiving various data to and from each of the image forming apparatuses 1 on the in-house network 7. The server-storage unit 62 is a storage unit such as a semiconductor memory, HDD or the like, and may also be a database server. The server-storage unit 62 stores operation setting values 621 for setting the setting information 131 of each of the image forming apparatuses 1 on the in-house network 7, and setting-change status 332 that is collected from each of the image forming apparatuses 1 on the in-house network 7.

The server-control unit 63 is connected to the server-communication unit 61 and the server-storage unit 62, respectively. The server-control unit 63 is an information-processing unit such as a microcomputer or the like that includes a CPU, ROM, RAM and the like. The ROM stores a control program for performing operation control of the management server 6. The control program may be recorded on a computer-readable recording medium and provided to the server-control unit 63. The CPU of the server-control unit 63 performs overall control of the management server 6 by reading the control program that is stored in ROM, expanding the control program in RAM, and executing the control program.

The server-control unit 63 functions as a batch-setting unit 631 and setting-management unit 632. The batch-setting unit 631 has a function of collectively reflecting the operation setting values 621 that are stored in the server-storage unit 62 in the setting information 131 of all of the image forming apparatuses 1 on the in-house network 7.

The setting-management unit 632 accumulates the setting-change status 332 received by the server-communication unit 61 from each of the image forming apparatuses 1 on the in-house network 7 in the server-storage unit 62. In addition, the setting-management unit 632 also has a function of collectively managing the histories of the setting changes of multiple image forming apparatuses 1 based on the setting-change status 332 and the operation setting values 621 that are accumulated in the server-storage unit 62.

Figure 7:
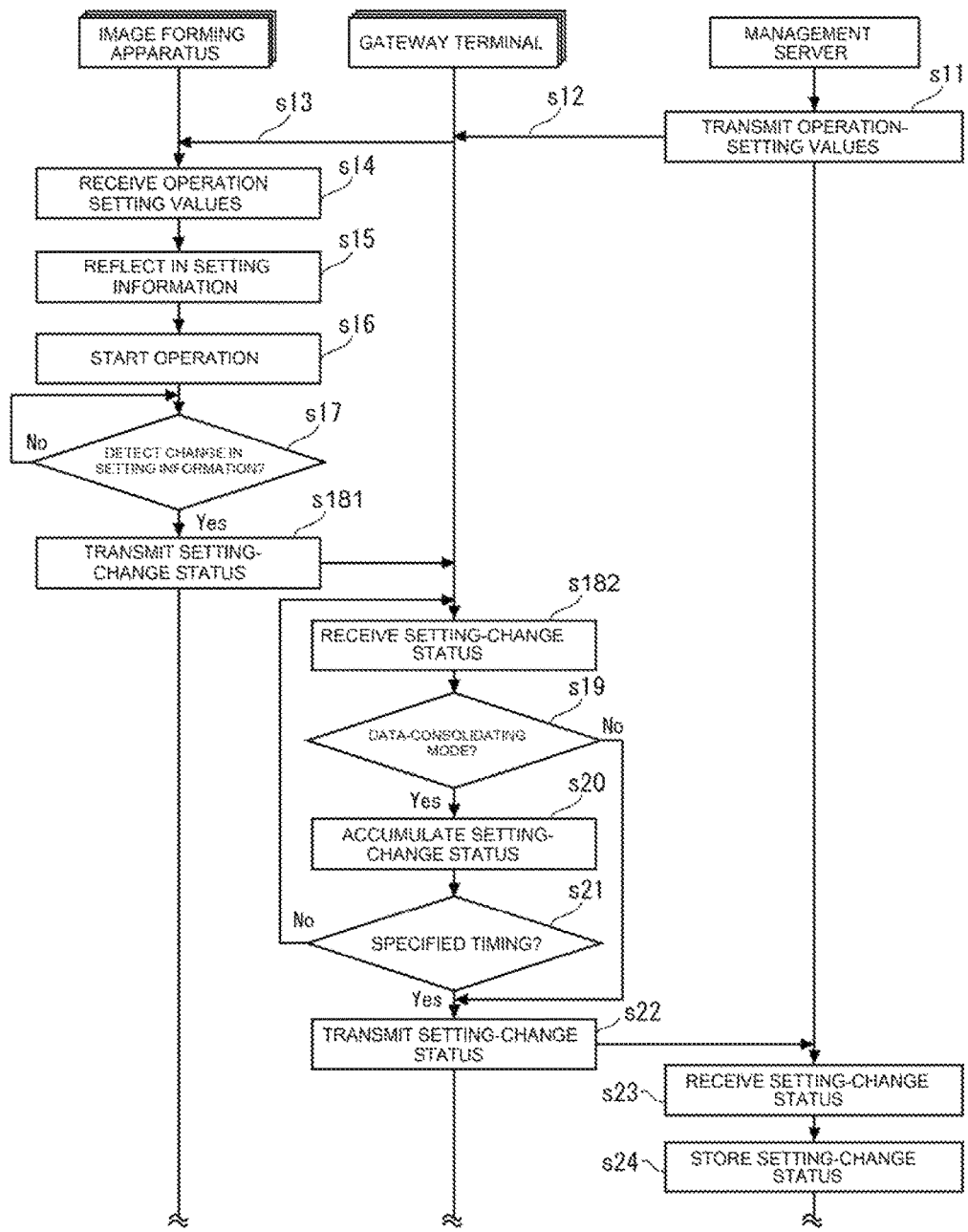
FIG. 7 is a flowchart illustrating the flow of a setting management process of the setting management system illustrated in FIG. 1.

Next, the flow of the setting-management operation by the setting management system 8 described above will be explained with reference to FIG. 7.

First, the batch-setting unit 631 of the management server 6 transmits the operation setting values 621 of each of the setting items of the setting information 131 by the server-communication unit 61 (step S11). The transmitted operation setting values 621 are transmitted to the respective gateway terminals 3 in each of the bases 5 via the proxy server 4 (step S12), and transmitted to each of the image forming apparatuses 1 by each of the gateway terminals 3 (step S13).

Next, when the communication unit 16 of an image forming apparatus 1 receives the operation setting values 621 (step S14), the setting-receiving unit 171*b*, for example, reflects the operation setting values 621 in the setting information 131 (step S15). Continuing, when operation starts (step S16), the image forming apparatus 1 waits until the change-detecting unit 172 detects a change in the setting information 131 (step S17, NO in step S17).

When the setting values that are inputted via the operation panel 11, user terminal 2 or the like are reflected in the setting information 131 by the setting-receiving units 171a, 171b, 171c, the change-detecting unit 172 detects a change in the setting information 131 (YES in step S17). Then, the change-status-transmitting unit 173 acquires the setting-change status 332, and transmits the setting-change status 332, including the transmission-mode flag that indicates the data-consolidating mode or real time mode, to the management server 6 by the communication unit 16 (step S181). In addition, the transmission mode may also be set to the data-consolidating mode based on the operation-setting value 62. Moreover, at this time, the setting-change status 332 that is transmitted the first time by the change-status-transmitting unit 173 may be the case in which the operating setting values 621 are set by the management server 6. Accordingly, feedback can be given to the management server 6 of whether or not the operation setting values 621 are correctly reflected in all of the image forming apparatuses 1 on the in-house network 7.

Next, after the gateway-communication unit 31 receives the setting-change status 332 from the image forming apparatus 1 (step S182), the gateway-control unit 32 determines whether or not the transmission-mode flag that is included in the setting-change status 332 is the data-consolidating mode (step S19).

In the case of the data-consolidating mode (YES in step S19), the gateway-control unit 32 accumulates the received setting-change status 332 in the gateway-storage unit 33 (step S20). Continuing, the gateway-control unit 32 determines whether or not specified timing such as every day, every hour or the like is reached (step S21), and when the specified timing is not reached (NO in step S21), processing returns to step S182. Therefore, until the specified timing is reached, the setting-change status 332 that is transmitted to the management server 6 from each image forming apparatus 1 in the base 5 is accumulated and collected in the gateway-storage unit 33.

When the specified timing is reached (YES in step S21), the gateway-control unit 32 transmits the setting-change status 332 that is accumulated in the gateway-storage unit 33 to the management server 6 (step S22). Moreover, when the transmission-mode flag is not the data-consolidating mode (NO in step S19), or in other words, in the case of the real time mode, the gateway-control unit 32 immediately transmits the setting-change status 332 that is received from an image forming apparatus 1 to the management server 6 without accumulating the setting-change status 332 in the gateway-storage unit 33 (step S22).

After the setting-change status 332 that is transmitted from the gateway terminal 3 is received by the server-communication unit 61 of the management server 6 via the proxy server 4 (step S23), the setting-management unit 632 stores the received setting-change status 332 in the server-storage unit 62 (step S24). The processing from step S17 to step S24 above is repeated during operating of the image forming apparatus 1.

In this way, the setting management system 8 of this embodiment is a setting management system 8 that includes: a management server 6 that transmits operation setting values 621; and multiple image forming apparatuses 1 that start operation based on the same setting information 131 in which the operation setting values 621 are reflected; wherein, each of the image forming apparatuses 1 includes: multiple setting-receiving units 171a, 171b, 171c that receive changes in the setting information 131 during operation; a change-detecting unit 172 that respectively detects that the setting information 131 has been changed by the respective setting-receiving units 171a, 171b, 171c; and a change-status-transmitting unit 173 that, every time a change in the setting information 131 is detected by the change-detecting unit 172, correlates the change in the setting information 131 with the setting-receiving unit 171a, 171b, 171c that received the change, and transmits the setting-change status 332 of the setting information 131; and the management server 6 includes: a server-communication unit 61 that receives setting-change status 332 from an image forming apparatus 1; and a setting-management unit 632 that collectively manages the histories of the setting changes in multiple image forming apparatuses 1 based on the setting-change status 332 and operating-setting values 621 that are received by the server-communication unit 61. As a result, the management server 6 is able to collectively manage the histories of setting changes in each of the image forming apparatuses 1 based on the operation setting values 621 that are commonly set for all of the image forming apparatuses 1 at the start of operation, and the setting-change status 332 that is transmitted from the image forming apparatuses 1 in which a setting change is performed.

Incidentally, in the embodiment described above, the management server 6, user terminal 2 or image forming apparatus 1 may be set so that the transmission mode is set to either the real time mode or data-consolidating mode. For example, the change-status-transmitting unit 173 of each image forming apparatus 1 may forcibly set the flag indicating the real time mode as the transmission-mode flag that is included in the setting-change status 332. This may also be the case in which the setting item that is changed by the setting-receiving unit 171a, 171b, 171c is an item related to the user interface such as the display language or the like, or a specified item such as in a case related to a special maintenance item such as the bias voltage or the like. This is in order to immediately inform the management server 6 that there is a possibility that the image forming apparatus 1 is operating inappropriately.

Moreover, when the frequency of transmitting setting-change status 332 is less than a specified frequency, the change-status-transmitting unit 173 may be set to switch the transmission mode from the data-consolidating mode to the real time mode. Furthermore, when the transmission frequency is equal to or greater than a specified frequency, the change-status-transmitting unit 173 may be set to switch from the real time mode to the data-consolidating mode. As a result, transmission cost may be suppressed.

Furthermore, the setting-management unit 632 of the management server 6 may, based on the setting-change status 332 that is transmitted from each image forming apparatus 1, select an image forming apparatus 1 as a centralized monitoring target, and set the transmission mode of the image forming apparatus 1 that is selected as the centralized monitoring target to the real time mode via the server-communication unit 61. For example, the setting-management unit 632 may analyze the setting-change status 332 that is accumulated in the server-storage unit 62, identify the base 5 having a large number of and high frequency of setting changes, and set each image forming apparatus 1 inside the identified base 5 to the real time mode. In addition, the setting-management unit 632 may identify a model among all of the image forming apparatuses 1 that has a large number of and high frequency of setting changes, and set each of the image forming apparatuses 1 that are of the same model as the identified model to the real time mode. In doing so, the setting-management unit 632, based on the setting status 332, is able to monitor the histories of setting change in real time with an image forming apparatus 1 that does not conform to the operation according to the operation setting values as a centralized monitoring target.

Moreover, the management server 6 may also include a report-output unit that analyzes the setting-change status 332 that is accumulated in the server-storage unit 62, and outputs a report to a specified manager terminal via the server-communication unit 61. The report may specify a base 5, user, or image forming apparatus 1 having a large number of or high frequency of setting changes, or may indicate setting change is likely to be performed in which paths of setting-receiving unit 171a, 171b, 171c, or the like. According to this, it becomes easier to examine measures for preventing the recurrence of trouble and the like that occurs due to a setting change.

Furthermore, in the embodiment described above, an example is explained in which the image forming apparatus 1 includes a real time mode and a data-consolidating mode as transmission modes, however, the gateway terminal 3 may also include these transmission modes. In this case, the setting-change status 332 that is transmitted from the image forming apparatus 1 does not need to include a transmission-mode flag. The gateway-control unit 32, based on the set transmission mode, may control transmission of the setting-change status 332 that is transmitted from each image forming apparatus 1 in the real time mode or data-consolidating mode. Incidentally, the transmission mode of the gateway terminal 3 may be set for the gateway terminal 3 from the management server 6, a user terminal 2 or an image forming apparatus 1. Moreover, operation buttons or switches for setting the transmission mode to the real time mode or data-consolidating mode may be provided on the frame of the gateway terminal 3.

Furthermore, when the setting-change status 332 is received, the management server 6 may send an alert to the server manager. In addition, when a setting-receiving unit 171a, 171b, 171c of an image forming apparatus 1 receives a setting change, an alert may be sent to the user that performed the setting change. Moreover, when executing a job that accompanies a setting change, the control unit 17 of the image forming apparatus 1 may leave an image log of the image data, and when there is a request from the manage server 6 for the image log, may transmit the image log by the communication unit 16 so that the image log can be verified by the manager.

In typical technology there is a problem in that settings of an image forming apparatus may be changed unnoticeably by a user, making it impossible to manage setting changes of an image forming apparatus.

With the technology according to the present disclosure, it is possible to manage the change status of the setting information of an image forming apparatus during operation.

The technology according to the present disclosure is not limited by the embodiment described above, and needless to say, various modifications can be made within a range that does not depart from the gist of the present disclosure.

What is claimed is:

1. A setting management system comprising:
   a management server that transmits operation setting values,
   multiple image forming apparatuses on the same network that start operation based on the same setting information in which the operation setting values are collectively reflected; and
   a gateway terminal that is connected to one or more of the multiple image forming apparatuses; wherein
   each of the image forming apparatuses comprises:
   multiple setting-receiving units that receive changes in the setting information during operation;
   a change-detecting unit that detects each of the changes in the setting information by the respective setting-receiving units; and
   a change-status-transmitting unit that, every time a change in the setting information is detected by the change-detecting unit, correlates the change in the setting information with the setting-receiving unit that receives the change, and transmits setting-change status of the setting information, wherein the setting-change status comprises device information of the respective image forming apparatus, and wherein the device information comprises model;
   the management server comprises:
   a server-communication unit that receives the setting-change statuses from the respective image forming apparatuses; and
   a setting-management unit that collectively manages the histories of the setting changes of the multiple image forming apparatuses based on the setting-change statuses that are received by the server-communication unit and the operation setting values;
   the gateway terminal comprises:
   a gateway-communication unit that receives the setting-change status that is transmitted from the image forming apparatus, and transmits the setting-change status to the management server;
   a gateway-storage unit that accumulates the setting-change status that is received by the gateway-communication unit; and
   a gateway-control unit that at every specified timing causes the setting-change status that is accumulated in the gateway-storage unit to be transmitted from the gateway-communication unit to the management server;
   each of the image forming apparatuses
   has as transmission modes for transmitting the setting-change status, a data-consolidating mode that causes consolidation of the setting-change status until a specified timing is reached and transmission of the setting-change status, and a real time mode that causes transmission of the setting-change status in real time;
   the change-status-transmitting unit
   transmits the setting-change status including a transmission-mode flag to the gateway terminal, wherein the transmission-mode flag indicates whether to transmit the setting-change status based on the data-consolidating mode or the real time mode as the transmission mode;
   the gateway-control unit
   controls whether to accumulate the setting-change status received by the gateway-communication unit in the gateway-storage unit until the specified timing is reached, or to immediately transmit the setting-change status to the management server by the gateway-communication unit based on the transmission-mode flag, and
   the setting-managing unit analyzes the received setting-change statuses and identifies, in the received setting-change statuses, a model having a high transmission frequency of the setting-change status among all the image forming apparatuses on the same network and switches each image forming apparatus of the multiple image forming apparatuses that is of the identified model to the real time mode.

2. The setting-management system according to claim 1 wherein the setting-change status includes the date and time of change to the setting information, the information of a person changing the setting information, device information of the respective image forming apparatus, interface information that indicates the setting-receiving unit, the changed setting item, and setting value after a change.

3. The setting management system according to claim 1, wherein the gateway-control unit causes the gateway-communication unit to transmit the setting-change status accumulated in the gateway-storage unit together as one text file.

4. The setting management system according to claim 3, wherein the gateway-control unit compresses and transmits the text file by the gateway-communication unit.

5. The setting management system according to claim 1, wherein the change-status-transmitting unit forcibly sets a flag indicating the real time mode as the transmission-mode flag that is included in the setting-change status when the setting item that is changed in the setting information is a specified item.

6. The setting management system according to claim 1, wherein the setting-management unit selects an image forming apparatus to be a central monitoring target based on the setting-change status that is transmitted from each of the image forming apparatuses, and sets the transmission mode of the image forming apparatus that is selected as the central monitoring target to the real time mode via the server-communication unit.

7. The setting management system according to claim 1, wherein the management server comprises a report-output unit that analyzes the setting-change status that is managed by the setting-management unit, and outputs a report related to the setting-change status.

* * * * *